United States Patent [19]
LeVan Suu

[11] Patent Number: 5,818,710
[45] Date of Patent: Oct. 6, 1998

[54] INTELLIGENT ELECTRIC SOCKET

[75] Inventor: Maurice LeVan Suu, Romainville, France

[73] Assignee: SGS-Thomson Microelectronics S.A., Saint Genis, France

[21] Appl. No.: 867,281

[22] Filed: Jun. 2, 1997

Related U.S. Application Data

[63] Continuation of Ser. No. 534,741, Sep. 27, 1995, abandoned, which is a continuation of Ser. No. 124,929, Sep. 21, 1993, abandoned.

[30] Foreign Application Priority Data

Sep. 23, 1992 [FR] France .................................. 92 11338

[51] Int. Cl.⁶ ................................................. G05B 11/01
[52] U.S. Cl. ........................... 364/141; 364/483; 340/656
[58] Field of Search ................................... 364/140, 141, 364/483, 492; 375/7–9, 37–39; 307/21–22; 361/356, 813; 340/656

[56] References Cited

U.S. PATENT DOCUMENTS 4,371,947  2/1983  Fujisawa .............................. 364/483 X
4,445,183  4/1984  McCollum et al. ..................... 364/483
4,500,934  2/1985  Kinsinger ..................................... 361/3
4,740,883  4/1988  McCollum .............................. 364/140
5,351,272  9/1994  Abraham ................................... 375/38

FOREIGN PATENT DOCUMENTS

A-0229268  7/1987  European Pat. Off. .
A-3608910  9/1987  Germany .
A-2060964  5/1981  United Kingdom .............. B08B 9/00
A-2197568  5/1988  United Kingdom ............. H04B 3/54

OTHER PUBLICATIONS

French Search Report from French Patent Application Serial Number 92 11338, filed Sep. 23, 1992.

*Primary Examiner*—Reba I. Elmore
*Assistant Examiner*—Sheela S. Rao
*Attorney, Agent, or Firm*—Wolf, Greenfield & Sacks, P.C.

[57] ABSTRACT

An intelligent electric socket is controlled by a command signal and includes a semiconductor switch. The socket also includes an electromechanical switch and a signal processor, the electromechanical switch being connected in parallel across the semiconductor switch. The signal processor receives the command signal and controls operation of semiconductor switch and the electromechanical switch.

17 Claims, 2 Drawing Sheets

INTELLIGENT ELECTRIC SOCKET

This application is a continuation of application Ser. No. 08/534,741 filed Sep. 27, 1995, now abandoned, which is a continuation of application Ser. No. 08/124, 929, filed Sep. 21, 1993, now abandoned.

BACKGROUND OF THE INVENTION

1. Field of the Invention

This invention relates to an electric socket which can be locally or remotely controlled.

2. Discussion of the Related Art

The development of house automation requires the implementation of intelligent electric sockets connected to a central control unit incorporating processor-based control circuits. These intelligent sockets are placed on a general network and their outputs, to which different domestic appliances can be linked, are powered up or removed from a circuit according to specific command signals received.

These sockets supply in return, to the central control unit, information concerning the execution of the commands received and, more generally, concerning the operation of the domestic appliances that they supply. It is, thus, possible to remotely control all the domestic appliances in the household.

Intelligent electric sockets are known and can be classified into two main categories:
- sockets incorporating an electromechanical switch; and
- sockets incorporating a semiconductor switch.

The object of the present invention is to provide an intelligent electric socket which presents neither the drawbacks of electromechanical switches, nor those of semiconductor switches, and which can be housed in an enclosed volume of small overall dimensions.

SUMMARY OF THE INVENTION

For this purpose, the present invention provides an intelligent electric socket controlled by a command signal and which incorporates a semi-conductor switch. In accordance with the invention, it further includes an electromechanical switch and a signal processor.

The electromechanical switch is connected in parallel across the semiconductor switch, and the command signal is received by the signal processor which then commands the semiconductor switch and the electromechanical switch.

Different embodiments of the present invention include the following characteristics in all technically possible combinations. When power is applied to the socket, first the semiconductor switch closes followed by the closing of the electromechanical switch. Inversely, on opening, first the electromechanical switch opens followed by the opening of the semiconductor switch.

The intelligent electric socket is placed in a main circuit carrying alternating current. The signal processor analyzes the waveform of the voltage in the main or power circuit at the terminals of the power switch, and closes or opens the electromechanical switch the moment the value of the voltage is low.

The semiconductor switch can include a triac, or a group of thyristors, or a group of Isolation Gate Bipolar Transistor type components. The electromechanical switch can be a mercury-contact relay. The signal processor is powered from the main circuit via a low-voltage regulator. The signal processor is remotely controlled. The command signal for the signal processor is sent to the signal processor via the main circuit. The command signal is received by a modem which sends it to the signal processor, the modem being connected in parallel in the main circuit.

BRIEF DESCRIPTION OF THE DRAWINGS

The following description of a particular embodiment of the invention is purely illustrative and non-limiting. It should be read in conjunction with the accompanying drawings, in which.

DETAILED DESCRIPTION

Figure 1:
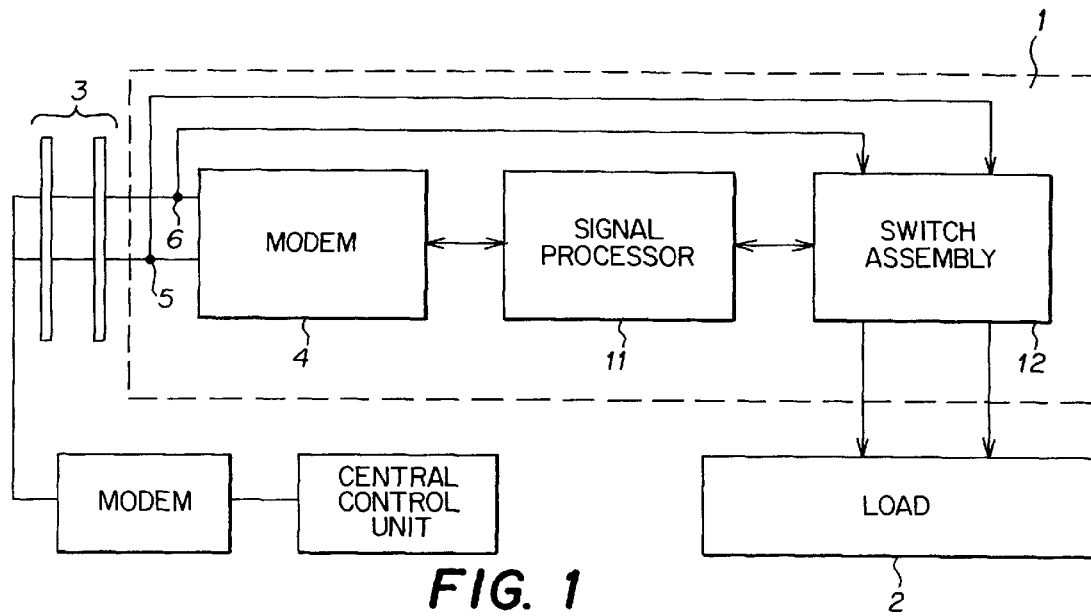
FIG. 1 is a placement block diagram showing where the intelligent socket of the present invention is placed on a main circuit.

Intelligent socket 1 is placed between a load 2 and a main power circuit 3. In accordance with conventional circuits, when the intelligent socket 1 is closed, load 2 is under tension, its power being supplied from the main circuit or power circuit 3. Conversely, when socket 1 is open, load 2 is disconnected from main circuit 3. The opening and closing of intelligent socket 1 are advantageously commanded remotely, for example by a signal flowing through power circuit 3 on a carrier and demodulated by modem 4. A local command can also or alternatively be provided.

A signal processor 11 incorporated in intelligent socket 1 receives the signal from modem 4 and commands switch assembly 12, interposed between main circuit 3 to which it is connected by terminals 5 and 6, and load 2. The modem 4 is also connected to terminals 5 and 6, and receives, via these same terminals, the modulated signal originating from power circuit 3.

Signal processor 11 can also send a signal indicating the open or closed state of intelligent socket 1, or even indicating the execution of a command. It can also send a signal originating from the appliance connected to the socket representing the nature or state of the appliance. Such a signal, sent by the signal processor, is sent by modem 4 through power circuit 3. A central control unit dialogues with signal processor 11 via a second modem linked to the main circuit.

Figure 2:
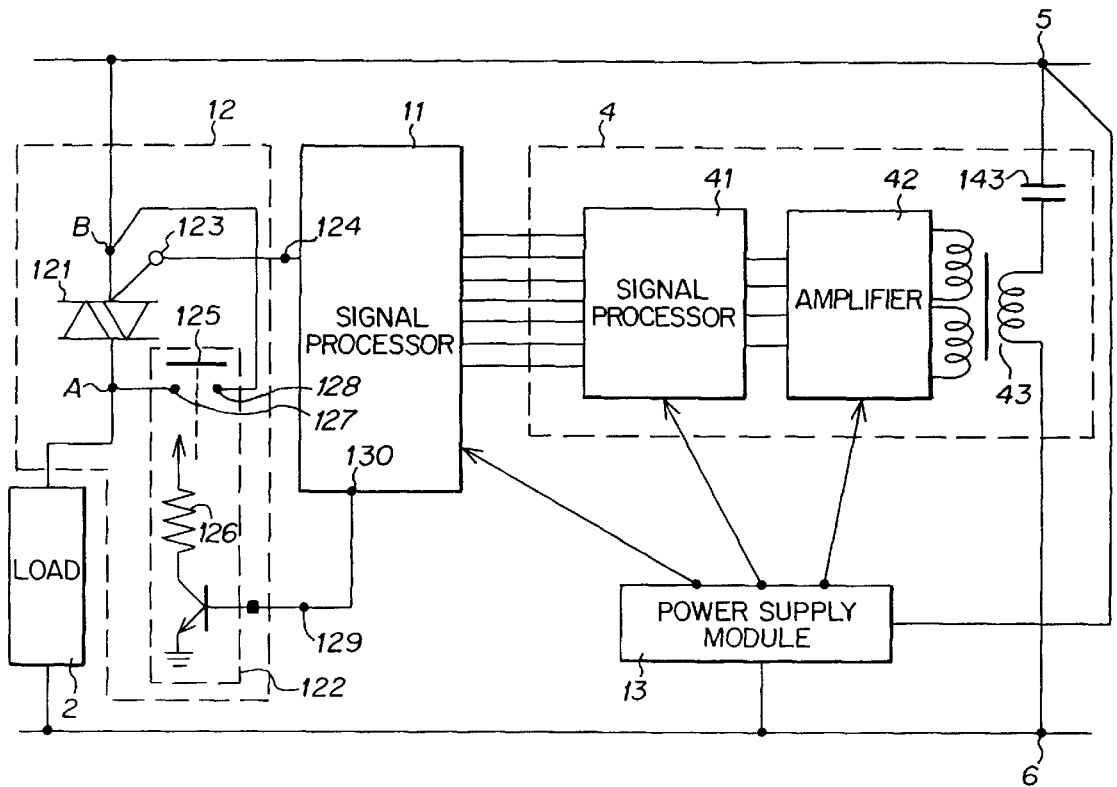
FIG. 2 is a partial schematic, partial block diagram identifying the different elements that make up the intelligent socket of the present invention.

Intelligent socket 1 is illustrated in greater detail in FIG. 2 which shows, by the same reference numbers as used in FIG. 1, terminals 5 and 6 of the main circuit, modem 4, signal processor 11, switch assembly 12 and load 2.

Switch assembly 12 includes a semiconductor switch 121 and an electromechanical switch 122 linked to one another at terminals A and B in such a way as to be parallel connected. The semiconductor switch 121 is advantageously a triac, whose trigger 123 is linked to gate one (124) of signal processor 11. This switch can alternatively take the form of a group of thyristors, or a group of Isolation Gate Bipolar Transistor type components.

Electromechanical switch 122 includes a coil 126 which, when energized, displaces contact 125 which is then able to link terminals 127 and 128. This electromechanical switch 122 can alternatively be bi-stable. For this alternate arrangement, switch 122 includes a permanent magnet core and two coils. Applying power to one or the other of these coils determines the direction of magnetization of the core. Thus, the state of the switch is maintained, even if there is a break in the supply of power. Control terminal 129 of the electromechanical switch is linked to gate two (130) of signal processor 11.

Modem 4 includes a signal processor 41, an operational amplifier 42 and a transformer 43. The primary winding of transformer 43 is linked to terminals 5 and 6 of the main, power circuit, with a capacitor 143 being connected between the primary winding and terminal 5 to stop transmission of parasitic interference. The secondary windings of the transformer 43 are linked to the operational amplifier which is, in turn, linked to signal processor 41 which sends signals to or receives signals from signal processor 11.

A power supply module 13, linked to terminals 5 and 6, furnishes the power that signal processor 41, operational amplifier 42 and signal processor 11 require in order to operate.

Figure 3:
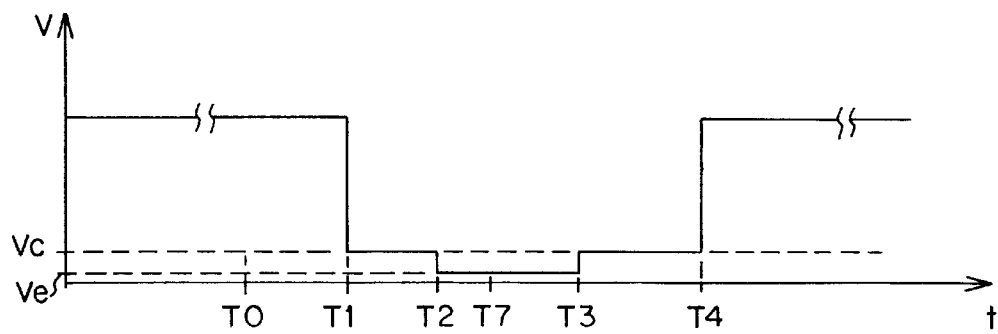
FIG. 3 is a timing diagram illustrating the operation of the intelligent socket of the present invention when it opens and closes.

The operation of the intelligent socket will now be described with reference to FIG. 3 in which the Y- axis represents the potential difference V=VB−VA present on the terminals of switch assembly 12, and the X- axis indicates time.

At time $T_O$ the intelligent socket is open, the potential difference V is therefore maximum and corresponds to the voltage supplied by main circuit 3. At $T_O$, modem 4 receives a command signal to close the intelligent socket and sends the signal to signal processor 11 which first proceeds to close the semiconductor switch within time interval $T_1$. The potential difference $V_B$–$V_A$ is then considerably diminished and is reduced to the fall voltage $V_C$ of the semiconductor switch.

Shortly afterwards, signal processor 11 commands the closing of electromechanical switch 122. As the fall voltage $V_e$ of electromechanical switch 122 is substantially lower than the fall voltage $V_C$ of semiconductor switch 121, the potential difference V=$V_B$–$V_A$ is reduced to the value $V_e$. The potential difference remains at this value throughout the closing of the intelligent socket (situation at $T_7$).

The opening of the intelligent socket is achieved in symmetrical fashion when signal processor 11 receives the corresponding order via modem 4.

At time $T_7$, the intelligent socket is closed, the signal processor then commands the opening of electromechanical switch 122 at time $T_3$. This causes voltage V=$V_B$–$V_A$ to rise from its minimum value $V_e$ to the value $V_C$ equal to the fall voltage of semiconductor switch 121. Semiconductor switch 121 is then opened at time T4, bringing voltage V=$V_B$–$V_A$ to its maximum value.

The essential advantage of the device can now be understood. Whenever electromechanical switch 122 opens or closes, it is only subjected to, at its terminals A and B, a potential difference equal to the, fall voltage $V_C$ of the semiconductor switch. This result, therefore, makes it possible to use a compact electromechanical switch and to limit wear.

As far as semiconductor switch 121 is concerned, the supply current of load 2 only flows through it during the intervals between $T_1$ and $T_2$, and $T_3$ and $T_4$. The negative effects due to the semiconductor switch 121 being heated when a heavy current flows though it are, therefore, reduced and virtually eliminated.

Preferably, the time interval between $T_2$ and $T_1$, and $T_4$ and $T_3$ is very brief, possibly only a few oscillations when main circuit 3 is carrying alternating current.

Figure 4:
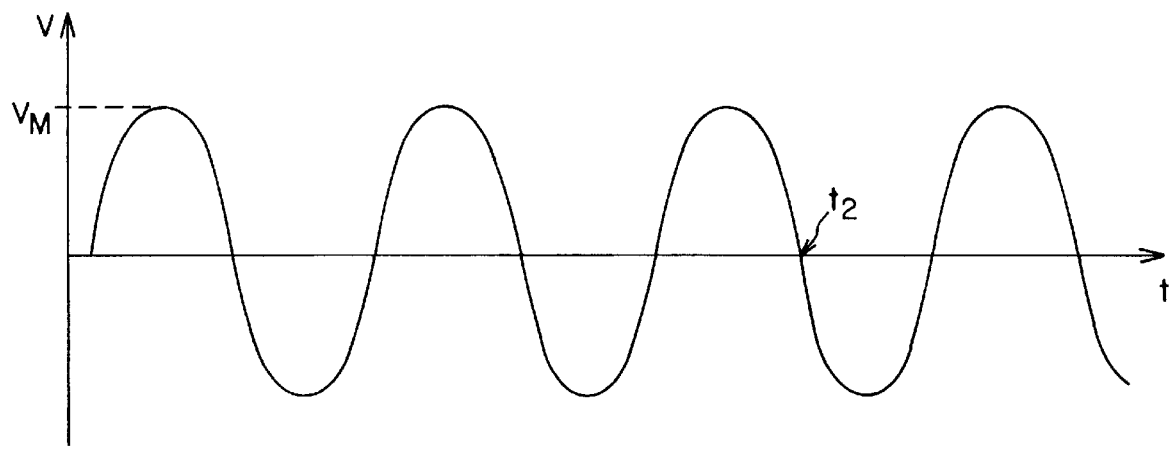
FIG. 4 and FIG. 5 are timing diagrams of the waveform of the voltage in the main circuit and the switching instants of the electromechanical switch in a preferred embodiment, respectively.
Figure 5:
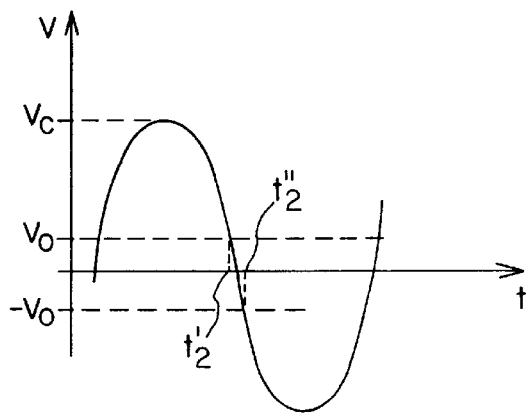

In a preferred embodiment, described below with reference to FIG. 4, the constraints affecting electromechanical switch 122 can be reduced even further. In this embodiment, signal processor 11 analyzes the waveform of voltage V=$V_B$–$V_A$ at the terminals of switch assembly 12. When the voltage in the main circuit is a sinusoidal voltage, voltage V=$V_B$—$V_A$ has the same form, and during the intervals between $T_2$ and $T_1$, and $T_3$ and $T_4$ it varies between +$V_C$ and −$V_C$.

Signal processor 11 uses the result of the analysis it performs to trigger the opening and closing of semiconductor switch 121 at instants $T_2$ and $T_3$, close to instants in which voltage V passes through zero. In other words, point $T_2$, for example, is positioned between instants t'$_2$ and t"$_2$ corresponding to voltages $V_O$ and −$V_O$, whose absolute value is substantially lower than the maximum, voltage $V_C$ likely to be present between terminals A and B when the semiconductor switch 121 is closed. Thus, electromechanical switch 122 only changes state when the absolute value of the voltage at its terminals is at most $V_O$, i.e. very low.

The intelligent socket of the invention is very small in volume and generates little heat. It is therefore ideal for embedding in the walls of homes.

This invention can be produced with components from different origins. Good results have been obtained using a triac as semiconductor switch 121 and using components sold by SGS- THOMSON™ under the following references:

for signal processor 11: ST6, ST7, ST8 or ST9, for modem 41: ST7536 or ST7537. The electromechanical switch 122 is advantageously a mercury-contact relay.

For the sake of an example, the invention can be made use of in the following conditions. If the voltage V of the main circuit is 200V at 50 or 60 Hz, then:

$V_C$=1.2V to 1.7V $V_e$=≈100 mv

The time interval between $T_2$ and $T_1$ is equal to 100 to 200 μs. The time interval between $T_3$ and $T_4$ equal to 100 to 200 μs.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An intelligent electric socket controlled by a command signal transferred with a power signal on a power line of a power circuit, wherein the power circuit includes first and second terminals, carrying alternating current voltage, the socket comprising:

a semiconductor switch including a triac;

an electromechanical switch connected in parallel with the semiconductor switch and including a mercury contact relay;

a signal processor, coupled to the semiconductor switch and the electromechanical switch, controlling operation of the semiconductor switch and the electromechanical switch in response to the command signal, wherein the signal processor is controlled by an external component, wherein the power line of the power circuit is coupled to the signal processor and provides the power signal to the signal processor, wherein the signal processor closes the semiconductor switch before the electromechanical switch and opens the electromechanical switch before the semiconductor switch, and wherein the signal processor analyzes a waveform of the alternating current voltage and closes and opens the electromechanical switch when the alternating current voltage is at a predetermined value which is less than one-fourth of a peak amplitude of the alternating current voltage;

a modem, coupled to the signal processor and the power line of the power circuit, the modem separating the command signal from the power signal on the power line and transferring the command signal from the power line of the power circuit to the signal processor; and a low-voltage regulator, coupled between the power line of the power circuit and the signal processor, receiving the power signal from the power line of the power circuit and providing the power to the signal processor.

2. An intelligent electric socket circuit comprising:

a semiconductor switch coupled to a power line of power means for providing a control signal and a power signal on the power line, wherein the semiconductor switch includes a triac;

an electromechanical switch coupled to the semiconductor switch and the power means, wherein the electromechanical switch includes a mercury contact relay;

control means, coupled to the semiconductor switch and the electromechanical switch, for controlling operation of the electromechanical switch and the semiconductor switch, wherein the control means is controlled by an external component, wherein the control means controls operation of the electromechanical switch and the semiconductor switch such that the semiconductor switch closes before the electromechanical switch and the electromechanical switch opens before the semiconductor switch, wherein the power line of the power means is coupled to the control means to supply the power signal to the control means, the power line of the power means carrying an alternating current voltage, and wherein the control means includes means for analyzing a waveform of the alternating current voltage and closing and opening the electromechanical switch when the alternating current voltage is at a predetermined value which is less than one-fourth of a peak amplitude of the alternating current voltage;

modem means, coupled to the power line of the power means, for separating the control signal from the power signal on the power line, and for transferring the control signal to the control means to control operation of the electromechanical switch and the semiconductor switch; and regulator means, coupled between the control means and the power line of the power means, for regulating voltage received from the power line of the power means.

3. A method for controlling operation of an intelligent electric socket comprising the steps of:

receiving a command signal and a power signal on a power supply line;

separating the command signal and the power signal;

analyzing a waveform of the power signal; and in response to the command signal, controlling operation of a semiconductor switch and an electromechanical switch, coupled to one another, such that the semiconductor switch closes before the electromechanical switch to provide the power signal to a load in the socket, and the electromechanical switch opens before the semiconductor switch and such that the electromechanical switch closes and opens when the power signal has a value which is less than one-fourth of a peak amplitude of the power signal.

4. The method as claimed in claim 3, wherein the power signal is an alternating current voltage waveform, and the method further includes the step of:

analyzing the alternating current voltage waveform on the power supply line and opening or closing the electromechanical switch when the alternating current voltage waveform is at a predetermined value.

5. The method as claimed in claim 3, wherein the step of controlling the operation of the semiconductor switch and the electromechanical switch includes the step of:

closing the semiconductor switch, and closing the electromechanical switch after closing the semiconductor switch to provide the power signal to a load in the socket.

6. The method as claimed in claim 3, wherein the step of controlling the operation of the semiconductor switch and the electromechanical switch includes the step of:

opening the electromechanical switch, and opening the semiconductor switch after opening the electromechanical switch to isolate a load in the socket from the power signal.

7. A system for selectively supplying power to an electric socket, the system comprising:

a semiconductor switch for connecting the electric socket to a power line of a power circuit;

an electromechanical switch connected in parallel with the semiconductor switch to connect the electric socket to the power line of the power circuit;

a signal processor, coupled to the power line, the semiconductor switch and the electromechanical switch, controlling operation of the semiconductor switch and the electromechanical switch, wherein the signal processor closes and opens the electromechanical switch when a value of a voltage on the power line is less than one-fourth of a peak amplitude of the voltage on the power line;

a first modem, coupled to the signal processor and the power line of the power circuit, the first modem receiving a command signal and a power signal from the power line of the power circuit, separating the command signal from the power signal, and transferring the command signal from the power line of the power circuit to the signal processor; and a central unit coupled to said power line of the power circuit to provide the command signal to the power line of the power circuit.

8. The system of claim 7, wherein the central unit includes a second modem for combining the command signal with the power signal to transmit the command signal to the power line of the power circuit.

9. The system of claim 7, wherein the central unit is disposed along the power circuit at a location displaced from the signal processor.

10. A system for providing a power signal from a power line to a load, the system comprising:

a modem, coupled to the power line, that receives the power signal and a command signal through the power line, separates the command signal from the power signal, and outputs the command signal;

a processing circuit, coupled to the modem and the power line, that outputs a switching signal in response to the command signal and a value of a voltage on the power line; and a switching circuit, coupled to each of the processing circuit, the load and the power line, that provides the power signal from the power line to the load in response to the switching signal so that the power signal is provided to the load when a voltage on the power line is less than one-fourth of a peak amplitude voltage.

11. The system of claim 10, wherein the modem includes:

an interface circuit that separates the command signal from the power signal, and prevents transmission of parasitic interference from the power line to the processing circuit.

12. The system of claim 11, wherein the interface circuit includes a transformer having a primary winding coupled to the power line, and a secondary winding, and wherein the modem further includes an amplifier and processor circuit interconnected between the secondary winding and the processing circuit.

13. The system of claim 12, wherein the amplifier and processor circuit is adapted to transfer signals from the transformer to the processing circuit, and from the processing circuit to the transformer.

14. The system of claim 10, further comprising:

a control unit, coupled to the power line, that generates the command signal, and transfers the command signal through the power line concurrently with the power signal to the modem.

15. The system of claim 10, wherein switching circuit includes:

a first switch and a second switch, each switch having a control input coupled to the processing circuit, a first terminal coupled to the power line and a second terminal coupled to the load.

16. The system of claim 15, wherein the first switch is a semiconductor switch, wherein the second switch is an electromechanical switch, and wherein the processing circuit is adapted to close the semiconductor switch before closing the electromechanical switch, and open the electromechanical switch before opening the semiconductor switch.

17. The system of claim 15, wherein the semiconductor switch includes a triac, and the electromechanical switch includes a mercury contact relay.

* * * * *